United States Patent [19]
Laswell et al.

[11] 3,829,146
[45] Aug. 13, 1974

[54] DELAYED PARACHUTE DISCONNECT

[75] Inventors: John E. Laswell, Bloomington; John E. Wildridge, Washington, both of Ind.

[73] Assignee: The United States of America as represented by the Secretary of the Navy, Washington, D.C.

[22] Filed: July 30, 1973

[21] Appl. No.: 383,841

[52] U.S. Cl. ............................. 294/83 A, 244/149
[51] Int. Cl. ......................................... B64d 17/38
[58] Field of Search ...... 294/83; 244/149, 150, 151; 24/201 D, 201 TR, 201 P, 241 SL, 241 PS

[56] References Cited
UNITED STATES PATENTS

| | | | |
|---|---|---|---|
| 2,483,044 | 9/1949 | Gongwer | 294/83 A |
| 2,517,361 | 8/1950 | Staats | 294/83 A |
| 2,682,425 | 6/1954 | Staats | 294/83 A |
| 2,842,392 | 7/1958 | Haake | 294/83 A |
| 2,995,323 | 8/1961 | Dann | 244/150 |
| 3,081,122 | 3/1963 | Jungerson | 294/83 R |
| 3,189,967 | 6/1965 | Walker et al. | 24/265 H |

FOREIGN PATENTS OR APPLICATIONS

| | | | |
|---|---|---|---|
| 738,046 | 10/1955 | Great Britain | 294/83 A |

*Primary Examiner*—Richard A. Schacher
*Assistant Examiner*—James L. Rowlands
*Attorney, Agent, or Firm*—R. S. Sciascia; Paul S. Collignon

[57] ABSTRACT

A delayed parachute disconnect having a piston slidably mounted in a cylinder having fluid therein. One end of the piston is releasably connected to a pulling element which automatically releases upon clearance from the cylinder. The piston is provided with an orifice and the speed of the piston is controlled by the fluid escaping through the orifice.

1 Claim, 3 Drawing Figures

PATENTED AUG 13 1974 3,829,146

DELAYED PARACHUTE DISCONNECT

BACKGROUND OF THE INVENTION

The present invention relates to a delayed parachute disconnect and particularly to a delayed parachute disconnect for reducing the deployment velocity of a main parachute system.

In the past, reefing line cutters have been incorporated into decelerator systems to reduce the deployment velocity of the main parachute system. The reduced deployment velocity is achieved by allowing the drogue parachute to decelerate the payload and main parachute. The parachute reefing line cutter usually has a 3-5 second delay between drogue parachute deployment and main parachute deployment. Since the opening shock loading is significantly decreased during the main parachute deployment when a reefing line cutter is employed, the main parachute and suspension system may be fabricated of lower strength materials. The lower strength materials cost less and usually occupy less volume. The cost and volume factors are highly critical in today's aircraft parachute flare competition.

The present cost of commercial reefing line cutters is prohibitively high with respect to the overall function that they perform and the total cost of the parachute flare. The parachute reefing line cutter consists of a firing pin, primer, pyrotechnic delay, explosive charge, knife, anvil, and housing. The reefing line cutter operation is initiated by pulling the firing pin, which functions the delay, which subsequently forces the knife to cut the reefing lanyard at the anvil. One such reefing line cutter is shown and described in U.S. Pat. No. 2,897,799, entitled, "Explosive Cutter For Parachute Lines," which issued Aug. 4, 1959, to Joe A. Stupian.

SUMMARY OF THE INVENTION

The present invention relates to a delayed parachute disconnect which releases after a piston travels a predetermined distance. The speed at which the piston travels is determined by an orifice which permits fluid to escape therethrough. The fluid opposes piston travel and movement is controlled by the size of the orifice. After a predetermined distance of travel, the piston becomes disengaged from a lanyard and it is this disengagement which initiates the main parachute opening. In one embodiment, a spring is provided to retain the piston in a forward inactive position and in another embodiment a shear pin prevents unwanted movement of the piston until a predetermined force is applied to the end of the piston.

DESCRIPTION OF THE PREFERRED EMBODIMENTS

Figure 1:
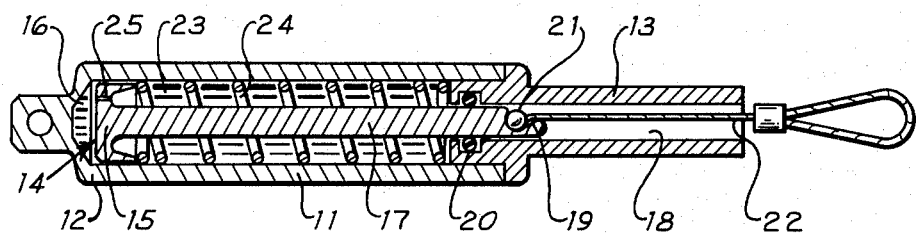
FIG. 1 is a longitudinal sectional view showing a preferred embodiment of the present invention.

Referring now to the drawing, there is shown in FIG. 1, a disconnect assembly having a cylindrical housing 11 which is closed at end 12 and has a head 13 attached to the other end. Head 13 might be attached, as by press-fitting, soldering, welding, or the like, or might be threadedly attached to housing 11. Piston 14 is provided and has an enlarged diameter end 15 that is slidably fitted in the bore 16 of housing 11, and piston 14 has a stem 17 which is slidably mounted in bore 18 of head 13. The end of stem 17 has a partial ball-socket 19 which receives a ball 21 on the end of a lanyard 22. The dimensions of the partial ball-socket 19 and ball 21 are such that when they are engaged and when the end of stem 17 is within bore 18, the ball is locked or retained in ball-socket 19.

A quantity of liquid 23, such as a 50 percent ethylene glycol-water solution, is provided within bore 16 of housing 11 and a coil spring 24 is provided to bias piston 14 toward end 12 of housing 11. It should be understood that other fluids, such as air and silicone fluid may also be used. In one design requirement of providing a 3-5 second delay period between initiation and separation, the 50 percent ethylene glycol-water solution provided the desired delay time, with silicone fluid providing longer delay times and air providing very short delay times. An orifice 25 is provided in the enlarged diameter end 15 of piston 14 and permits fluid 23 to pass therethrough when piston 14 is moved in a direction to compress spring 24. A ring seal 20 is provided to seal stem 17 so that fluid 23 is retained within bore 16.

Figure 3:
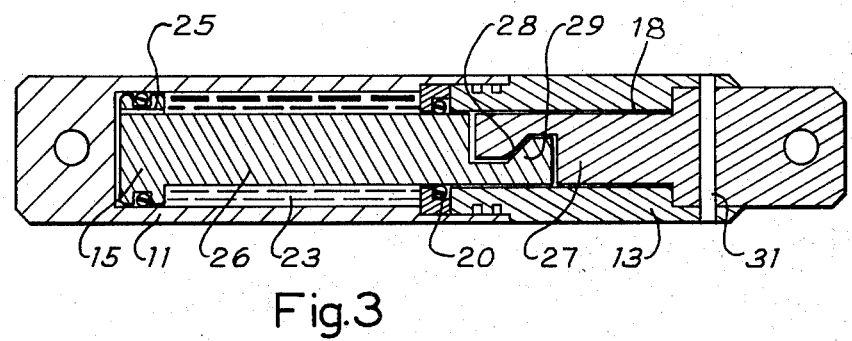
FIG. 3 is a longitudinal sectional view of another embodiment of the present invention.

Referring now to FIG. 3 of the drawing, there is shown another embodiment of the present invention wherein stem 26 and shaft 27 are provided with complementary tapered portions 29 and 28, respectively, which locks stem 26 and shaft 27 together as long as they are within the bore 18 of head 13. A shear pin 31 retains shafts 26 until sufficient force is applied to shear pin 31 and allows movement. Thus the need for spring 24, which is used in the embodiment of FIG. 1 is eliminated.

OPERATION

Figure 2:
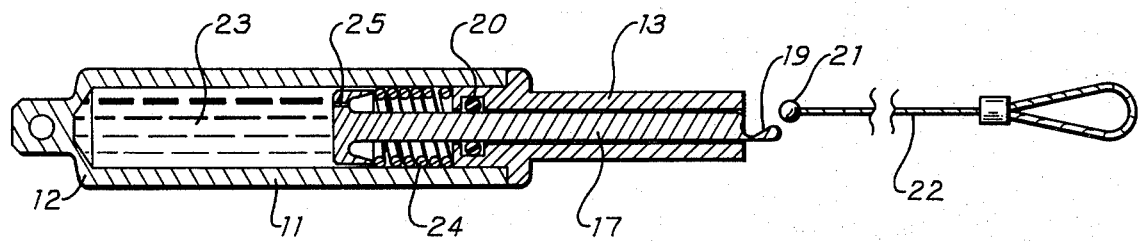
FIG. 2 is a sectional view similar to FIG. 1 only showing a lanyard in a released condition.

Referring specifically to FIGS. 1 and 2 of the drawing, spring 24 biases piston 14 so that the enlarged diameter end 15 is adjacent end 12. Ball 21 on the end of lanyard 22 is engaged in partial ball-socket 19 and thus connects lanyard 22 with stem 17. Upon launch from an aircraft, in connection with a parachute assembly, tension is applied to lanyard 22 by a drogue parachute thereby moving piston 14 in a direction to compress spring 24. Movement of piston 14 is, however, controlled by fluid 23 which must pass through orifice 25. Thus it can be seen that the velocity of piston 14 is controlled by the size of orifice 25. As best shown in FIG. 2 of the drawing, when the end of stem 17 moves beyond the end of head 13, ball 21 is released from ball-socket 19 and this release is used to initiate the main parachute opening.

In the embodiment shown in FIG. 3 of the drawing, movement of shafts 26 and 27 is prevented by shear pin 31. When the force on the end of shaft 27 becomes sufficiently large, pin 31 shears and movement of shaft 27 causes shaft 26 to move. Movement of shaft 26 is, however, controlled by fluid 23 which must pass through orifice 25. Stem 26 and shaft 27 remain connected until the tapered portions 28 and 29 clear head 13, whereupon stem 26 and shaft 27 separate, and it is this separation that initiates the main parachute opening.

It can thus be seen that the present invention provides a mechanical parachute disconnect that can provide a delay time of 3-5 seconds between drogue parachute deployment and main parachute deployment.

Obviously many modifications and variations of the present invention are possible in the light of the above teachings. It is therefore to be understood that within the scope of the appended claims the invention may be practiced otherwise than as specifically described.

We claim:

1. A delayed parachute disconnect comprising,
 a housing having a cavity therein, said housing being closed at one end and partially closed at the opposite end by a head having a bore therein,
 a quantity of fluid within said cavity,
 a piston slidably mounted in said housing, said piston being comprised of a stem having a partial ball-socket on one end thereof and an enlarged diameter portion on the opposite end thereof, said enlarged diameter portion being movable in said cavity and said end having a partial ball-socket being movable in said bore,
 an orifice in said enlarged diameter portion of said piston,
 a spring biasing said enlarged diameter portion of said piston toward said closed end of said housing, and
 a lanyard extending in said bore of said head and having a ball on one end engageable with said partial ball-socket on said stem, said ball being retained in said partial ball-socket by the surface of said bore and the opposite end of said lanyard being connectable to a parachute whereby a force applied to said lanyard moves said piston at a velocity controlled by fluid passing through said orifice thereby providing a delay between the time said force is first applied and the time said ball clears said bore thereby disconnecting said lanyard from said stem.

* * * * *